Jan. 15, 1957

F. J. HOLMES 2,778,003

AIRSPEED INDICATOR

Filed April 29, 1955

2 Sheets-Sheet 1

Inventor

FREDERICK JOHN HOLMES.

By Ward, Neal, Haselton, Orme & McElhannon

Attorneys.

Jan. 15, 1957 F. J. HOLMES 2,778,003

AIRSPEED INDICATOR

Filed April 29, 1955 2 Sheets-Sheet 2

Inventor
FREDERICK JOHN HOLMES.
By
Ward, Neal, Haselton, Orme & McElhannon
Attorney

United States Patent Office 2,778,003

Patented Jan. 15, 1957

2,778,003

AIRSPEED INDICATOR

Frederick John Holmes, Tring, England

Application April 29, 1955, Serial No. 505,015

Claims priority, application Great Britain April 30, 1954

2 Claims. (Cl. 340—27)

Figure 1:
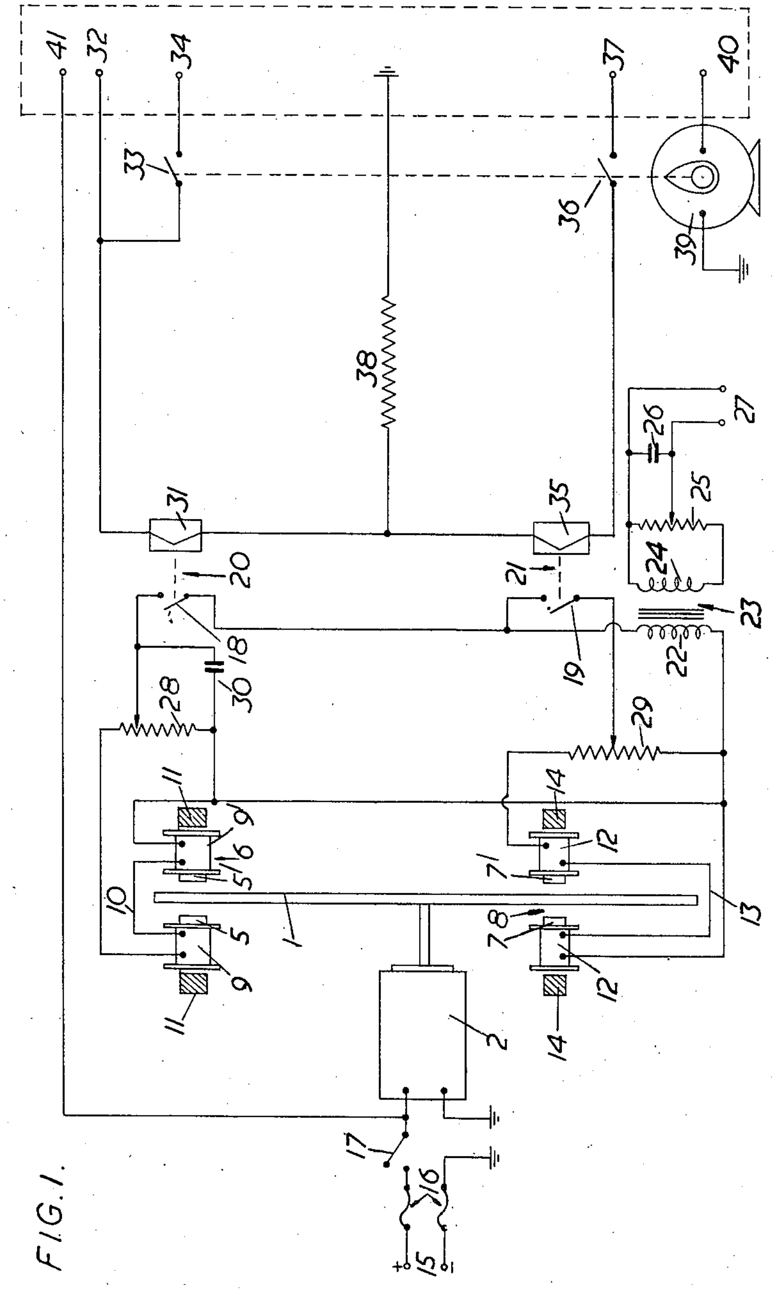

This invention concerns a new or improved device for generating sonic frequency signals.

According to this invention there is provided a sonic frequency signal generator comprising: a disc of magnetically permeable material having at least one circle of areas of reduced permeability arranged on equiangularly spaced radii of said disc; means for rotating said disc about its axis; a pick-up coil located to scan said circle of areas as said disc rotates; and means impressing a magnetic flux on said disc in the vicinity of said pick-up coil.

Such a generator may be used to produce a plurality of notes by providing a plurality of circles of areas of reduced conductivity and a corresponding number of pick-up coils scanning these circles.

The quality of the note produced, i. e. the wave form of the signal generated, may be altered by altering the shape of the areas of reduced permeability, a convenient way of forming said areas of reduced permeability being to cut apertures in the disc.

Although a sonic frequency signal generator according to this invention may be used for many purposes, it is particularly suitable for use in apparatus for indicating information by means of audible signals.

Thus the generator may be used to give the departure of some parameter from a preselected datum value.

According to a further aspect of this invention, there is provided apparatus for indicating audibly the value of a parameter relative to a preselected datum value, such apparatus comprising: a disc of magnetically permeable material having at least one circle of areas of reduced permeability arranged on equiangularly spaced radii of said disc; means for rotating said disc about its axis; a pick-up coil located to scan said circle of areas as said disc rotates; means impressing a magnetic flux on said disc in the vicinity of said pick-up coil; means for interrupting the output from said pick-up coil; and control means sensitive to the value of the parameter for selectively controlling said interrupter means.

Thus, where the sonic frequency signal generator produces one note only, the output may be continuous when the parameter has the preselected datum value, interrupted with a high frequency of interruption when the parameter has a value above the datum value and be interrupted with a low frequency of interruption when the parameter has a value below the datum value.

However, it is preferred to use a sonic frequency signal generator producing more than one note, and in particular two notes, one low and one high, circuit means, also controlled by said control means, then being conveniently provided selectively to control the output of the apparatus. In a preferred apparatus in which the sonic frequency generator used is a two tone generator, i. e. produces two notes, the circuit means and interrupter means are arranged so that when the parameter has the datum value a high continuous note is produced, when the parameter has a value above the datum value a high interrupted note is produced and when the parameter has a value below the datum value a low interrupted note is superimposed on the continuous high note, the frequency of interruption of both notes decreasing as the parameter approaches the datum value.

Apparatus of this form may usefully be employed when the parameter is the airspeed of an aircraft, it often being necessary for the pilot of an aircraft to maintain the latter at a definite speed or within a definite range of speeds. For example, when approaching to land, it is necessary for the pilot to maintain the speed of his aircraft at or near the optimum approach speed.

During a landing approach the pilot has so many factors and instruments to consider that his visual capacity is substantially exhausted and consequently his reactions to changes of information given by visual indicators are slow.

This invention further provides audible airspeed indicating apparatus for aircraft, such apparatus comprising a sonic frequency signal generator, means for interrupting the output of said generator and airspeed sensing means controlling said interrupter means to indicate departure of airspeed from a preselected datum value.

Since for a given loading in any given aircraft the airspeed is a function of angle of attack, the airspeed sensing means may comprise angle of attack sensing means. This arrangement has the advantage that regardless of the weight of an aircraft furnished with the apparatus, audible signals produced by the apparatus may indicate the airspeed of the aircraft in relation to its stalling speed at that weight.

Figure 2:
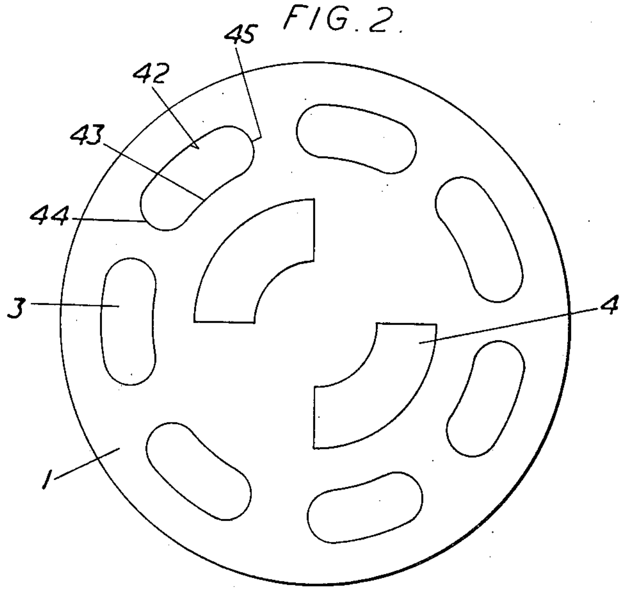

In order that the invention may more readily be understood, one embodiment of the same will now be described by way of example with reference to the accompanying drawings in which:

Figure 1 is a schematic diagram of one embodiment of apparatus according to this invention; and Figure 2 is a plan view of the apertured disc of the apparatus of Figure 1.

The drawings illustrate apparatus for use in indicating the value of airspeed of an aircraft relative to a datum value, such apparatus comprising a two-tone sonic frequency signal generator according to the invention, interrupter means and circuit means for controlling the output of the generator in dependence of the airspeed.

The two-tone sonic frequency signal generator comprises a disc 1 of soft iron, mild steel or like magnetically permeable material mounted for rotation about its axis by an electric motor 2. The disc 1, as shown in detail in Figure 2, has therein two circles of apertures 3 and 4. The circle 3 has seven apertures equiangularly spaced around the disc near the circumference thereof, whilst the circle 4 has two apertures equiangularly spaced around the disc near the centre thereof.

The disc is arranged to rotate so that the apertures of the circle 3 pass successively between soft iron, mild steel or like pole pieces 5 and 5' of a pick-up 6 and the apertures of the circle 4 pass successively between similar pole pieces 7 and 7' of a pick-up 8. The pick-up 6 comprises a pair of wire wound coils 9 and 9' embracing the pole pieces 5 and 5' respectively and connected together in series by connection 10, the pole pieces 5 and 5' being bridged by means of a suitable magnetic system 11 which may consist of a permanent magnet or energised electromagnet and acts to create a magnetic field between the faces of the pole pieces.

The pick-up 8 is similar to the pick-up 6 and comprises a pair of wire wound coils 12 and 12' embracing the pole pieces 7 and 7' and connected together in series by a connection 13, the pole pieces being bridged by a magnetic system 14 similar to the system 11.

Power for the operation of the motor 2 is fed from a 24 volt, or other suitable power supply 15 via a pair of fuses 16 and a switch 17.

Rotation of the disc 1 and the consequent passage of the apertures of each set between the respective pick-ups 6 and 8 cause currents to be induced in each pair of coils 9, 9' and 12, 12' and these currents may be fed respectively via make contacts 18 and 19 of relays 20 and 21 respectively to the primary winding 22 of a transformer 23, the secondary winding 24 of which is connected via a circuit conveniently comprising a volume control potentiometer 25 and condenser 26 to output terminals 27 from which the signals may be passed to earphones or the like to produce audible signals.

If desired the connections between the coils 9, 9' and 12, 12' to the respective contacts 18 and 19 may include potentiometers 28 and 29 to provide for adjustment of the relative strengths of the currents impressed upon the primary winding 22 of transformer 23 from the pick-ups 6 and 8 respectively. Conveniently a condenser 30 may be provided in the output circuit of pick-up 6 to filter out any unwanted harmonic frequencies.

The frequency of the currents induced in each pair of coils varies in direct proportion to the number of apertures passing between the coils and the speed of rotation of the disc. In the present illustrative embodiment, with seven apertures in circle 3 and two apertures in circle 4, if the speed of rotation of the disc is selected as 6,000 revolutions per minute, the frequency of currents induced in the pair of coils 9, 9' will be 700 cycles per second, and the frequency of currents induced in the pair of coils 12, 12' will be 200 cycles per second.

Thus with this arrangement, if contacts 18 are closed, a high note will be heard in earphones or the like connected to terminals 27 whilst, if contacts 19 are closed, a low note will be heard in such earphones or the like.

In order that the two tone generator above described may be used, for example, to indicate the value of the airspeed of an aircraft relative to a datum value, the operation of relay contacts 18 and 19 is arranged to be controlled by a circuit responsive to airspeed sensing means. In Figure 1 there is illustrated a particularly simple circuit arrangement for control of the contacts 18 and 19. In this arrangement, one end of relay coil 31 of relay 20 is connected directly to a terminal 32 and also via switch contacts 33 to a second terminal 34, whilst one end of relay coil 35 of relay 21 is connected via switch contacts 36 to a terminal 37. The other ends of the relay coils 31 and 35 are connected via a limit resistance 38 to earth. Closure of switch contacts 33 and 36 is controlled by an interrupter 39 comprising a variable speed motor having a rotating cam or other suitable means for producing intermittent operation of the contacts 33 and 36. Power is supplied to the interrupter 39 via a terminal 40 and power is supplied from source 15 to a terminal 41.

Supply of power from terminal 41 to terminals 32, 34, 37 and 40 is controlled by airspeed sensing means of any convenient type. In the example being described, the airspeed sensing means is adapted to interconnect terminal 41 with terminal 34 when the airspeed is above a preselected datum value, such as, for example, the optimum approach speed, with terminal 32 when the airspeed is at the datum value and with both terminals 32 and 37 when the airspeed is below the datum value. The airspeed sensing means is also adapted to supply power to the interrupter 39 so that the frequency of interruption is zero when the airspeed has the datum value and increases the further the value of the airspeed departs from the datum value.

The result of such an arrangement is that as the airspeed decreases from a value above the datum value to a value below the datum value, the output of the apparatus will at first be an interrupted high note having a high frequency of interruption. Then, as the airspeed decreases, the frequency of interruption of the high note will decrease until, at the datum value, the frequency of interruption is zero and a continuous high note is produced. Further decrease of the airspeed will cause an interrupted low note to be superimposed on the uninterrupted high note, the frequency of interruption of the low note increasing as the airspeed further decreases.

The airspeed sensing means may be of any convenient form and may thus comprise a pitot tube and pressure responsive capsule arrangement, the mechanical movemet derived from the capsule being amplified by a servo-mechanism.

The quality of the note or notes produced by the sonic frequency signal generator hereinbefore described may be varied either by varying the shape of the pole pieces of the pick-ups or by varying the shape of the apertures in the disc.

In Figure 2, each of the seven apertures of circle 3 is formed of four circular arcs, an outer arc 42, an inner arc 43, and two side arcs 44 and 45, the outer and inner arcs 42 and 43 being arcs of circles concentric with the disc. It has been found that the particular shape illustrated for these seven apertures produces an output having substantially pure sine wave form.

I claim:

1. Audible airspeed indicating apparatus for aircraft, such apparatus comprising a disc of magnetically permeable material having two concentric circles of apertures therein, each circle having its apertures on equiangularly spaced radii of said disc, but the two circles having a different number of apertures; means for rotating said disc about its axis; a pair of pole pieces of magnetically permeable material positioned to scan each circle of apertures; a permanent magnet bridging each pair of pole pieces; a pick-up coil for each pair of pole pieces, such coil comprising two series windings, one wound about each of said pole pieces; circuit means for selectively controlling the output from the two pick-up coils; and means for interrupting said output, said circuit means and interrupting means being controlled by means responsive to airspeed.

2. Audible airspeed indicating apparatus for aircraft, such apparatus comprising: a disc of magnetically permeable material; a first circle of seven apertures arranged on equiangularly spaced radii of said disc; a second circle of two apertures arranged on equiangularly spaced radii of said disc, such second circle being concentric with, but of smaller diameter than, said first circle; means for rotating said disc about its axis; a pair of pole pieces of magnetically permeable material positioned to scan each circle of apertures; a magnetic system bridging each pair of pole pieces; a pick-up coil for each circle of apertures, such coil comprising two series windings, one wound about each of the pole pieces of the appropriate pair of pole pieces; circuit means for selectively controlling the output from the two pick-up coils; and means for interrupting said output, said circuit means and interrupter means being controlled by means responsive to airspeed.

References Cited in the file of this patent

UNITED STATES PATENTS

| | | |
|---|---|---|
| 2,395,368 | Bull | Feb. 19, 1946 |
| 2,468,042 | Cranberg | Apr. 26, 1949 |
| 2,519,015 | Bensen | Aug. 15, 1950 |
| 2,658,192 | Spoon et al. | Nov. 3, 1953 |
| 2,702,897 | Dewey | Feb. 22, 1955 |